(12) United States Patent
King et al.

(10) Patent No.: US 11,492,276 B2
(45) Date of Patent: **\*Nov. 8, 2022**

(54) DISPENSING SYSTEMS

(71) Applicant: King Technology Inc., Hopkins, MN (US)

(72) Inventors: Joseph A. King, Wayzata, MN (US); Jeffrey D. Johnson, Edina, MN (US); Donald Dalland, Mantorville, MN (US)

(73) Assignee: KING TECHNOLOGY, INC.

( * ) Notice: Subject to any disclaimer, the term of this patent is extended or adjusted under 35 U.S.C. 154(b) by 0 days.

This patent is subject to a terminal disclaimer.

(21) Appl. No.: 16/974,117

(22) Filed: Oct. 6, 2020

(65) Prior Publication Data

US 2021/0024384 A1    Jan. 28, 2021

Related U.S. Application Data

(62) Division of application No. 15/932,663, filed on Apr. 3, 2018, now Pat. No. 10,843,944, which is a division of application No. 13/998,304, filed on Oct. 18, 2013, now Pat. No. 10,029,932.

(60) Provisional application No. 61/795,549, filed on Oct. 19, 2012.

(51) Int. Cl.
| | |
|---|---|
| *C02F 1/50* | (2006.01) |
| *E04H 4/12* | (2006.01) |
| *C02F 1/68* | (2006.01) |
| *B65D 83/04* | (2006.01) |
| *C02F 1/76* | (2006.01) |
| *B01F 21/20* | (2022.01) |
| *B01F 21/00* | (2022.01) |

(52) U.S. Cl.
CPC .............. *C02F 1/505* (2013.01); *B01F 21/22* (2022.01); *C02F 1/688* (2013.01); *E04H 4/1281* (2013.01); *B01F 21/402* (2022.01); *B65D 83/04* (2013.01); *C02F 1/76* (2013.01); *Y10T 29/49716* (2015.01)

(58) Field of Classification Search
CPC .. C02F 1/505; C02F 1/688; C02F 1/76; B01F 1/0027; B01F 2001/0055; E04H 4/1281; Y10T 29/49716; B65D 83/04
USPC .................... 210/167.11, 753, 754, 755, 756
See application file for complete search history.

(56) References Cited

U.S. PATENT DOCUMENTS

| | | | | |
|---|---|---|---|---|
| 4,630,634 A | * | 12/1986 | Sasaki ..................... | C02F 1/688 137/268 |
| 7,922,982 B1 | * | 4/2011 | Brennan .................. | C02F 1/688 422/265 |
| 10,843,944 B2 | * | 11/2020 | King ........................ | C02F 1/505 |
| 2002/0020676 A1 | * | 2/2002 | King ..................... | B01F 1/0027 210/753 |
| 2008/0217258 A1 | * | 9/2008 | Buchan ................... | C02F 1/688 210/747.5 |

(Continued)

*Primary Examiner* — Fred Prince
(74) *Attorney, Agent, or Firm* — Johnson & Phung LLC

(57) ABSTRACT

A non-dissolvable immersible dispensing puck in the shape of a dissolvable halogen puck when the dissolvable halogen puck is in an undissolved state with the non-dissolvable immersible dispensing puck physically interchangeable with a dissolvable halogen puck when placed in a dispenser for normally holding only a set of halogen pucks to enable a single dispersant dispenser to be converted to a dual dispersant dispenser without changing the structure of the single dispersant dispenser by placing a dispenser within a dispenser wherein only one of the dispensers may be provided with adjustable water ports.

6 Claims, 3 Drawing Sheets

(56) References Cited

U.S. PATENT DOCUMENTS

2009/0200246 A1* 8/2009 King .................. C02F 1/505
                                              210/755
2014/0205512 A1* 7/2014 King .................. C02F 1/688
                                              422/265

* cited by examiner

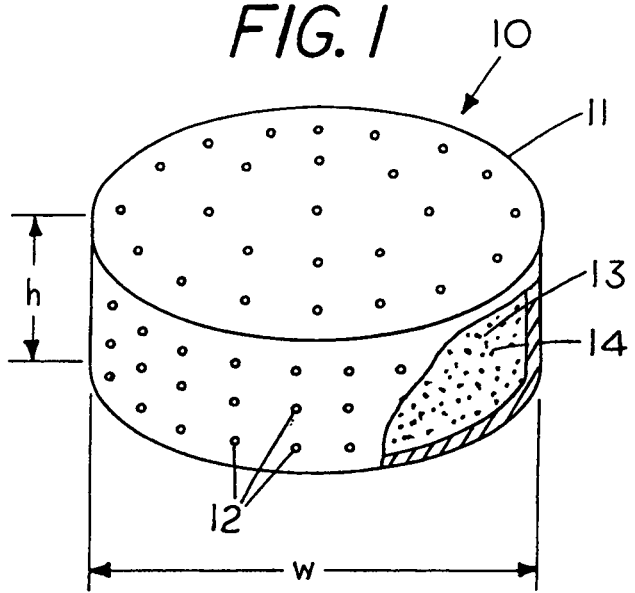
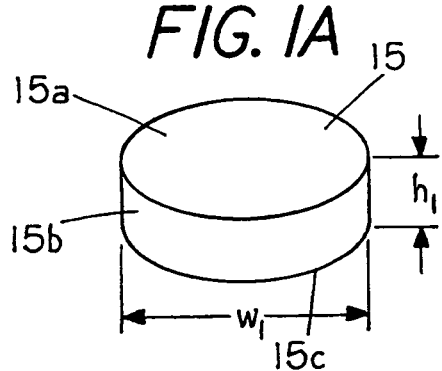
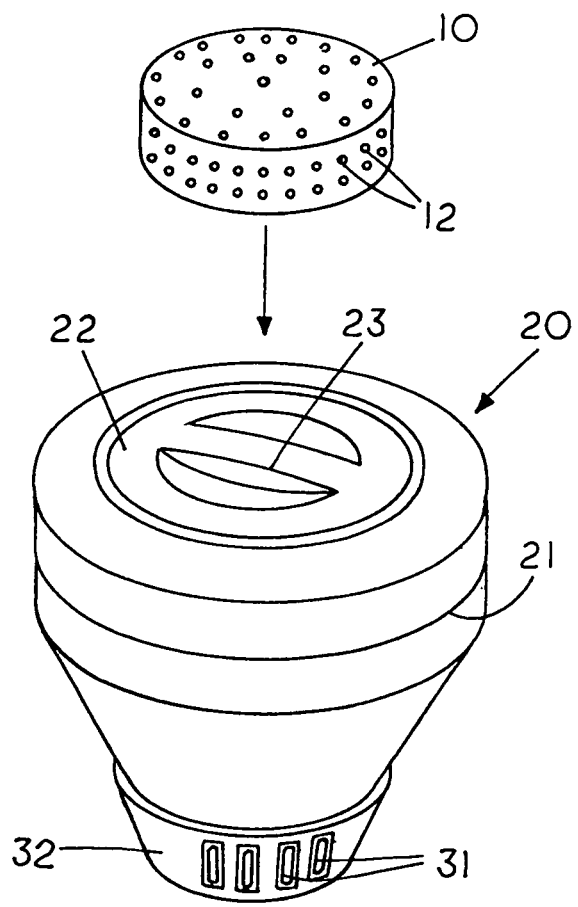

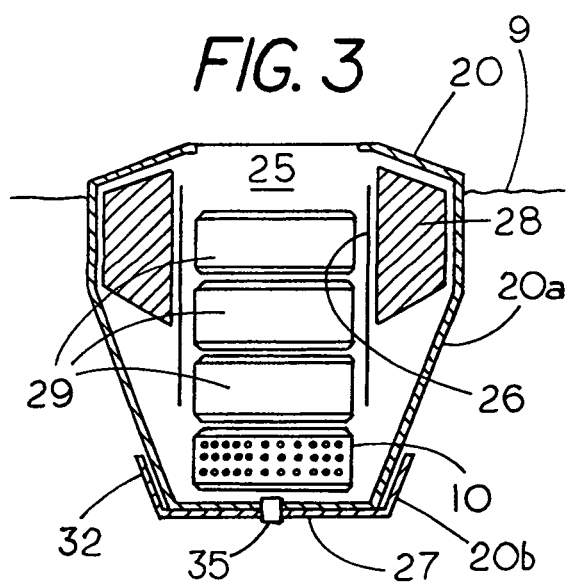
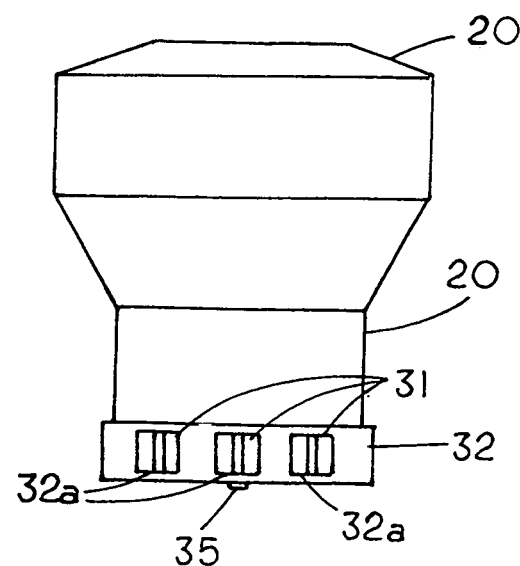
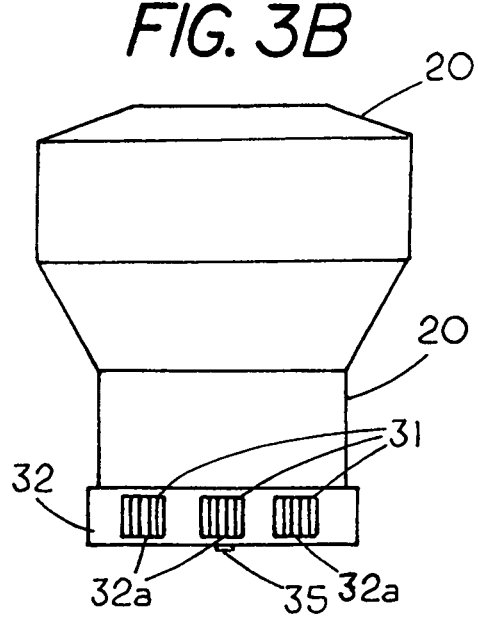

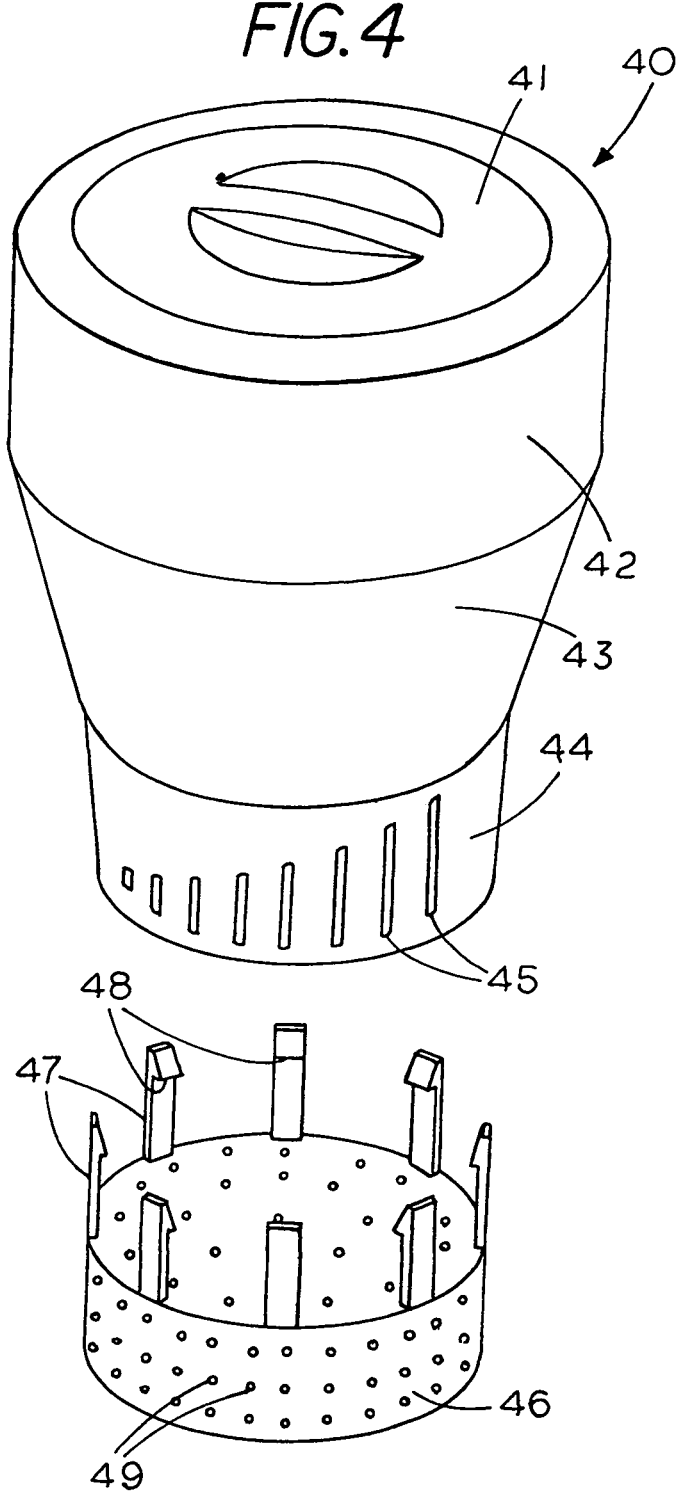

DISPENSING SYSTEMS

CROSS REFERENCE TO RELATED APPLICATIONS

This application is a divisional application of patent application Ser. No. 15/932,663 filed Apr. 3, 2018 titled Dispensing System (pending), which is a divisional application of patent application Ser. No. 13/998,304 filed Oct. 18, 2013 titled Dispensing Systems (U.S. Pat. No. 10,029,932), which claims priority from, provisional application Ser. No. 61/795,549 filed Oct. 19, 2012.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of cylindrical shapes such as disks is well recognized in the art with the term puck often applied to products that have a cylindrical shape with the height of the product less than the diameter of the product. One well-known cylindrical shape, which comprises a disk of hard rubber, is a hockey puck. Other articles, which also have a cylindrical shape, are often referred to as pucks including halogen pucks such as chlorine pucks and bromine pucks, which are used to sanitize a body of water. Typically, the halogen pucks comprises a water dissolvable halogen in solid form, which can be placed in a dispenser located in or in contact with a body of water such as a pool or a spa to provide for a gradual release of the halogen into the water as the water comes into contact with the outer surfaces of the halogen puck. Typically, the commercially available halogen pucks have a diameter of about 3 inches and a thickness that ranges from about 1 inch to about 1-¼ inches. The pucks may be placed in either an inline system or in a floating dispenser.

SUMMARY OF THE INVENTION

Briefly the invention comprises a non-dissolvable immersible standalone-dispensing puck in the shape of a dissolvable halogen puck when the dissolvable halogen puck is in an undissolved state with the non-dissolvable immersible dispensing puck physically interchangeable with a dissolvable halogen puck when placed in a dispenser for normally holding only a set of halogen pucks. The non-dissolvable immersible dispensing puck, which contains a dispersant, and the halogen puck can be maintained in a dispersing condition when placed alongside each other in a dispenser to convert a single dispersant dispenser to a dual dispersant dispenser where the level of halogen in a body of water can be maintained at a lower level than if only the halogen puck were used in the dispenser. The non-dissolvable immersible dispensing puck allows one to quickly convert a single dispensing dispenser to a dual dispensing dispenser without altering the structure of the dispenser by forming a dispenser within a dispenser.

BRIEF DESCRIPTION OF THE DRAWINGS

FIG. 1 is a perspective view of a non-dissolvable immersible dispensing puck;

FIG. 1A is a perspective view of a halogen puck;

FIG. 2 is an exploded view of a floating disperser and a non-dissolvable immersible dispensing puck;

FIG. 3 is a sectional view of a floating disperser with the non-dissolvable immersible dispensing puck and a set of halogen pucks located therein;

FIG. 3A is a front view of the floating dispenser of FIG. 3 with adjustable water ports located in a first condition;

FIG. 3B is a front view of the floating dispenser of FIG. 3 with the adjustable water ports located in a second dispensing condition; and FIG. 4 is an exploded view of non-dissolvable immersible dispensing puck that is externally securable to the floating dispenser.

DESCRIPTION OF THE PREFERRED EMBODIMENT

FIG. 1 is a perspective view of an example of a non-dissolvable, immersible, non-halogen dispensing puck 10 having a height h and a diametrical width W with the non-dissolvable, immersible, non-halogen dispensing puck having a cylindrical chamber 13 therein with the chamber containing a source of metal ions 14, which for example may be a batch of minerals that release metal ions. In operation, metal ions such as silver ions are released into the body of water as the water comes in contact with the source of metal ions i.e. the minerals 14 contained within the dispensing puck 10. The cylindrical housing 11 of puck 10 comprises a non-water dissolvable cylindrical shell that includes a plurality of water ports 12 located therein for ingress and egress of water to chamber 13 to thereby release metal ions into the body of water as the water contacts the minerals 14. Other sources of ions may be contained within housing 11 without departing from the spirit and scope of the invention.

Typically, housing 11 comprises a rigid, non-water dissolvable material, for example a polymer plastic, which maintains its shape during the dissipation of metal ions therefrom and having a structure that is unaffected by pool or spa water. In this example water ports 12 are located on the sides, top and bottom of the puck 10 although the ports may be located on only the sides of the puck without departing from the spirit and scope of the invention. The purpose of the water ports 12 is to provide for egress and ingress of water into the interior chamber 13 to bring the water into contact with the minerals 14 therein to thereby release metal ions into the body of water. Examples of metal ions suitable for treating a water to reduce harmful organisms include silver ions, copper ions or zinc ions. Although minerals have been described herein it can be appreciated that other types of water treatment materials may be incorporated into the standalone puck 10 that can be inserted into the dispensing chamber of another dispenser. While minerals may be retained within the puck 10 in some cases the water ports may be sized to permit particles to flow therethrough. In the example shown housing 11 contains a single chamber 13, however, in some cases one may want to include two or more chambers within puck 10 to provide a benefit of maintaining two or more different dispersants in separate compartments within the puck 10. For example one may want to include dispersants such as one or more of the following silver, silver chloride, clarifiers, algaecides, algaestats, aluminum sulfate, copper sulfate or zinc within a compartment or compartments within the housing 11. The form of the dispersant within the housing 11 may be granular, tabular or other types of solids. For example, suitable dispersants may include dispersants such as granular or tabular DCDMH. In some cases one may seek to replace a halogen puck with one or more dispenser pucks where the dispenser pucks contain different dispersants. In some instances the dispenser puck may occupy more than the space of a single halogen puck and in other cases the dispenser puck may occupy less space than a single halogen puck. Thus, the dispenser puck described herein allows one to convert a halogen dispenser into a devices for simultaneously delivery of two or more dispersants to a body of water either through multiple compartments within the dispenser puck or through multiple dispenser pucks which may or may not have the same shape or size as the halogen pucks as long as the dispenser pucks can be fitted into the space normally occupied by the halogen puck in the dispenser. While the invention is ideally suitable for those floating or non-floating dispensers where the halogen pucks are stacked in a face to face condition the invention may be used in those floating or non-floating dispensers where the halogen is in a different shape than a puck. For example, in some cases the halogen within the floating or non-floating dispenser may or may not have a cylindrical shape as well as being located in a random or irregular arrangement within a chamber within the floating or non-floating dispenser.

FIG. 1 shows a perspective view of the non-halogen dispensing puck 10 and FIG. 1A shows a perspective view of a halogen puck 15 revealing that both pucks have the same shape. The non-halogen puck 10 shown in FIG. 1 has a diameter W and a height h and the halogen puck shown in FIG. 1A, which has a top circular surface 15a, a bottom circular surface 15c and a cylindrical sidewall has a thickness designated by $h_1$ and diameter of the puck is designated by $W_1$ which generally are the same if not identical dimensions for most commercially available halogen pucks. A feature of the dispensing puck 11 is that the size and shape of dispensing puck 10 is substantially the same as a commercially available halogen puck and thus is interchangeable with a halogen puck 15 contained in a dispenser. Typically, the dispensers that receive the halogen puck contain a cylindrical chamber that has a diameter slightly larger than the halogen puck to allow halogen pucks to be freely stacked within the cylindrical chamber of the dispenser. A floating dispenser may have a cylindrical compartment for typically receiving 2 to 6 halogen pucks although other dispensers may be able to accommodate more or less halogen pucks. While the invention is described in regard to stacked pucks within a chamber in some cases the halogen pucks and the dispensing puck 10 may be held in a non-stacked condition in a dispenser. The feature of interchangeably of the dispensing puck 10 with a halogen puck as described herein enables one to change a single dispersant dispensing device into a dispenser that can simultaneously deliver two or more dispersants into a body of water without having to alter or change the dispenser.

Typically, the solid halogen pucks are manufactured with a width or diameter W of about 3 inches and thickness, which may range from 1 to 1¼ inches. The standardization of the size of halogen pucks, although with variations, has lead to creation of pool or spa single dispersant dispensers having a cylindrical chambers where one can stack multiple halogen pucks therein so that the halogen can be dispensed into the body of water over period of time. The single dispersant dispensers are generally oversized sufficiently so as to accommodate the variation in diametrical dimensions and height and width of the halogen pucks which may vary a ¼ inch or more from puck manufacture to puck manufacturer. Such single dispersant dispensing devices, while suitable for dispensing a halogen into a body of water such as a pool or spa are generally not suitable for dispensing a second water treatment material into the body of water since the dispenser contains a single chamber which is not suitable for holding or dispensing other materials into the body of water. While a dispenser with a single compartment for a halogen puck is shown it is envisioned that dispensers that have more than one halogen compartment may be used with the present invention.

FIG. 2 is a perspective view of the non-dissolvable puck 10 of the present invention proximate a prior art conventional floating halogen dispenser 20 which is used to dispenses a halogen into a body of water as the dispenser floats in the body of water. Halogen dispenser 20 contains an outer body 21 and a cap 22 with a finger grip 23 for twistingly removing cover 22 from the dispenser so that the halogen pucks therein can be replenished. Located on the bottom of dispenser 20 is a water port adjustment member 32 that can be rotated to provide for greater ingress or egress of water into water ports 31 in the floating dispenser 21 thereby providing adjustable water ports.

FIG. 1 shows the non-dissolvable immersible dispensing puck 10 in the shape of a dissolvable halogen puck 15 (FIG. 1A) when the dissolvable halogen puck 15 is in an undissolved state with the non-dissolvable immersible dispensing puck 10 physically interchangeable with a dissolvable halogen puck 15 when placed in a dispenser for normally holding only a set of halogen pucks. As FIG. 1 shows the non-dissolvable immersible dispensing puck 10 comprises a rigid sidewall 18 joining, a rigid cylindrical bottom member 17 to a rigid cylindrical top member 11 to form a closed container 10 having a dispersant compartment 13 therein with a source of metal ions 14 located in compartment 13. FIG. 1 shows container 10 having a plurality of water ports 12 of fixed area for water to flow in and out of the mineral compartment 13 with a batch of minerals 14 located in compartment 13. A feature of the invention is that the non-dissolvable immersible dispensing puck 10 can be maintained in a dispersing condition when placed alongside a halogen puck in the floating dispenser of FIG. 2. While the water ports 12 are shown as fixed the water ports may also be adjustable without departing from the spirit and scope of the invention.

FIG. 3 is a sectional view of the floating halogen dispenser 20 with the cover removed to reveal an annular flotation member 28 for supporting the dispenser 20 and the contents with at least a portion of the dispenser 20 located above a water air interface, i.e. the water line 9. Dispenser 20 includes a central halogen chamber 25 for receiving and holding four halogen pucks therein with the lower base of dispenser 20 including a set of adjustable openings 31 or water ports to control the amount of water coming into contact with the halogen in chamber 25 and consequently controlling the rate of release of the halogen into the body of water.

In the example of FIG. 3 the floating halogen dispenser 20 has been converted to a multi water treatment dispenser through the placement of a non-dissolvable immersible dispensing puck 10 in the chamber 25 together with the placement of three similar shaped water dissolvable halogen pucks 28. The halogen pucks are stacked in a face-to-face condition on top of the non-dissolvable immersible dispensing puck 10 with the top cylindrical surface 11 forming a separator between the halogen pucks 29 and the dispersant within the non-dissolvable immersible dispensing puck 10.

The conversion of the floating halogen dispenser 20 that contains only a single halogen dispersant into a floating dispenser that contains two different water treatment materials allows one to reduce the level of halogen in the body of water by providing a second water treatment material to supplement the first water treatment material without having to alter the structure of the floating dispenser or obtain a new dispenser. Consequently, the invention herein allows one to obtain the benefit of the combination of two biocides such as a halogen and a source of metal ions, which can reduce the need for a high halogen level that is required if only a single halogen is used as a sanitizer. Typically, systems such as in inline systems, which dispense two dispersants, are known to have dispensers that contain a separate chamber for a halogen and a separate chamber for a source of metal ions whereas the invention described herein uses only a single dispersant chamber to dispenser both dispersants.

In the present example the open area of adjustable water ports 31 at the bottom of floating dispenser 20 can be adjusted to limit the amount of halogen that is released into the body of water by rotation of sleeve 32, which is rotationally supported by member 35, about housing 20. While the nature of most floating dispensers is that they do not provide precise control of the halogen they do allow one to decrease or increase the amount of halogen delivered to the body of water by closing or opening the number of water ports 31 that are visible through sleeve openings 32a. Sleeve 32 is rotationally supported by housing 20, typically through a pivot pin such as member 32. In this example the number of openings 32a can be aligned with respect to ports 31 in housing sidewall 20 to control the ingress and egress of water into the chamber within the dispenser 20.

Although the flow area access to the halogen can be limited to thereby reduce the level of halogen in the body of water the level of metal ions released from the non-dissolvable puck 10 can remain relative constant as long as water is present in the chamber in the puck 10. Thus, in the example shown a conventional halogen dispenser 20 can be converted from a single biocide dispenser to a two biocide dispenser by placing a both a dissolvable halogen puck 29 and a non-dissolvable immersible dispensing puck 10 containing a dispersant, such as a source of metal ions, into the chamber 25 and reducing the flow area of the water ports 31 to lower the level of the first biocide. By lowering the level of the first biocide, in this case the halogen, and introducing a second biocide the body of water can be maintained in condition for human immersion without having the odoriferous presence of a high level of halogen that can accompany dispensers that rely on using only a halogen to sanitize a body of water such as a pool or spa.

A feature of the invention is that sufficient minerals can be placed in the nondissolvable puck 10 to supplement the halogen which can increase the period that the body of water can be maintained in the proper state since the minerals contained in puck 10 can provide metal ions for sanitizing the body of water for a period that is longer than the normal dispensing life of halogen pucks located in a floating dispenser. Thus without increasing the capacity of the dispenser to hold more pucks one can increase the dispensing life of a dispenser by using both halogen pucks and a source of metal ions. The same dispenser can provide a longer period of effective sanitization in a body of water then the same dispenser containing halogen pucks in spite of the fact one of the halogen pucks has been replaced with the mineral puck. Thus, a decrease in the rate of halogen released into the body of water can be used to lengthen the effective dispensing life of the dispenser since the biocide dispersant from the puck 10 supplements the halogen sanitization of the body of water. While results may vary with different dispensers one may able to lengthen the period that an effective amount of halogen is present in the dispenser from days to weeks when the halogen biocide is supplemented by a second biocide. Consequently, one lengthens the sanitizing life of the dispenser even though one of the halogen pucks may be replaced with a non-dissolvable immersible dispensing puck containing a source of metal ions. Thus reducing the consumers need to replenish the biocides in the floating dispenser 20.

As less halogen is required when a supplemental biocide is used, such as a source of metal ions, the open area of the water ports of dispenser ports 31 can be reduced by rotating shutter 32 to lessen the area for flow therethrough to thereby lessen the rate that water comes into contact with the halogen. In practice the flow thorough area of the ports in the non-dissoavle puck may be coordinated with the flow through area of the openings into the halogen chamber 25 so that under the normal dispensing conditions the halogen and the metal ions create a balance that maintains the body of water free of harmful organisms while at the same time maintains the halogen at levels which are less than if the halogen was used as the sole sanitizing agent to maintain the body of water in a sanitized condition for human immersion or recreational use.

FIG. 3 shows a sectional view of cylindrical halogen dispenser 20 having a single dispersant chamber 25 for normally delivering a single dispersant with the dispenser comprising a housing 20a having a cylindrical halogen chamber 25, which normally holds a plurality of halogen pucks 29. In the example of FIG. 3 a non-dissolvable immersible dispensing puck 10 having an interchangeable shape with a halogen puck 29 has been placed in halogen chamber 25 and occupies the space, which would normally contain an additional halogen puck. FIG. 3 shows the dispenser 20 contains a non-dissolvable immersible dispensing puck 10 and a plurality of halogen pucks, which in this case is 3, for simultaneously dispensing dispersants from both the non-dissolvable immersible dispensing puck 10 and the halogen pucks. In the example shown the mineral puck 10 retains its shape while the halogen pucks 29 change their shape as they are dissipated into the body of water.

FIG. 4 shows another example of a method and apparatus for converting a single halogen dispenser into a dual dispenser with the halogen dispenser 40 having a cap 41 for insertion of a halogen puck therein. The dispenser includes an upper body 42 with a flotation member therein (not shown) and a frusto conical wall 43 that connects to the base 44 that includes a set of ports 45 and a rotateable sleeve 44 to permit ingress and egress of water into the halogen pucks that are located in the dispenser 40. In this example, the non-dissolvable immersible puck 46, which contains a source of metal ions, has been fitted with a set of axially extending elongated resilient strips 47 that extend around the periphery of the puck 46. Each of the strips 48 include a lip 48 for engaging a feature of the dispenser 40 to enable the puck 46 to be mounted externally to the halogen chamber in the dispenser 40. A feature of this example is that the working life of the dispenser can be extended in two ways. The first is that the use of the external puck 10 does not occupy any space in the internal halogen chamber and thus does not affect the normal life of the halogen even if the rate of halogen dissipation was kept constant. The second is that because the level of halogen can be reduced the dispenser has a longer life. Consequently, through the external attachment of the second biocide dispenser to the halogen dispenser one can further increase the time between the addition of halogen to the dispenser 40. In the event the weight of the extra external mineral puck 46 causes the dispenser 40 to sink the dispenser will automatically surface once the halogen pucks begin to dissipate. Thus, a feature of the invention is that in some cases one can actually add the dispensing puck 10 to the exterior of a floating dispenser and not replace the internal space for the halogen pucks. In the event the external puck 10 causes the floating dispenser to sink, the performance of the floating dispenser would be unaffected since the floating dispenser will automatically surface once the halogen pucks are partially consumed.

An additional feature of the invention is illustrated in FIG. 3A and FIG. 3B which shows the sanitization setting on the floating dispenser in FIG. 3B has a larger open area 31 than the open area 31 of FIG. 3A. Typically, the setting as shown in FIG. 3B would be a setting where the water ports have more open area and would used when only halogen in present in the floating dispenser and the setting shown in FIG. 3A is the setting used when the floating dispensers contains both a halogen puck 29 and a non-dissolvable immersible dispensing puck 10 since the water port area 31 has less open area than shown in FIG. 3B.

FIG. 3 also illustrates the method of converting a floating dispenser 20 normally having only a single dispersant chamber 25 and a single dispersant sanitizing mode to a dual dispersant sanitizing mode without altering the structure of the floating dispenser and at the same time requiring less halogen to maintain a body of water in a sanitized condition by placing both a halogen puck and a nondissolvable mineral puck 10 containing a source of metal ions in the single dispersant chamber 25. FIG. 3 shows that one stacks a plurality of water dissolvable halogen pucks 29 and the nondissolvable mineral puck 10 on top of each other and in a face-to-face condition in the single halogen dispersant chamber 25 with the nondissolvable mineral puck 10 having an interchangeable shape with each of the plurality of water dissolvable halogen pucks 29. Once the sanitization pucks 10 and 29 are placed in the halogen chamber 25 one selects a dual dispersant water port sanitizing setting, which has lesser area of water ports than in the single dispersant mode, such as shown in FIG. 3A, for sanitizing a body of water with at least two dispersants. The dual sanitizing water port setting on the floating dispensers has less open port area for egress and egress of water therethrough than a single dispersant water port where the sanitizing setting is for a stack of only water dissolvable halogen pucks therein. FIG. 3B illustrates the large area of open water ports 31 when the floating dispenser is in only the halogen-dispensing mode.

Once the floating dispenser 20 has been properly set one places the dispenser 20 with the nondissolvable mineral puck 10 and the water dissolvable halogen pucks 29 in the body of water to bring the nondissolvable mineral puck 10 and the water dissolvable halogen pucks 29 into a water release condition for simultaneously releasing both metal ions and a halogen through water port 31 of the floating dispenser 20 where the water port 31 is located below a water line 9 to thereby maintain the body of water in a halogen and metal ion sanitized condition through the use of both halogen pucks 29 and a mineral puck 10.

Thus, with the use of both halogen pucks 29 and the non-dissolvable immersible dispensing puck 10 one can decrease the halogen level in a pool or spa having a floating halogen dispenser through manipulation or adjustment of the open area of water ports 31. Thus, a needed level of halogen can be reduced when both the halogen 29 and the dispensing puck 10 are used to maintain the pool or spa in sanitized condition for human immersion. For example when halogen is used alone a level of halogen in excess of 2 ppm in the pool or spa may be necessary but when used in combination with a mineral puck the level of halogen such as chlorine can be less than 2 ppm.

To effect the change from a single dispersant to a dual dispersant dispenser one can determine a first water port setting of the floating dispenser 20 that maintains a pool or spa in a safe condition for human contact over a first sanitation period when only a set of halogen pucks are located in the floating dispenser. One places at least one mineral puck 10 in a halogen chamber 25 of the floating halogen as shown in FIG. 3 wherein the weight of the mineral puck 10 is equal or less than the weight the halogen puck 29. Next one can convert the dispenser from a single dispersing mode to a dual dispersing mode by placing a plurality of halogen pucks 29 in a halogen chamber 25 (see FIG. 3) in the floating dispenser 40. Next, one reduces the water port setting from the first water port setting (FIG. 3B) to reduce the halogen level to a normally unsafe level (FIG. 3A) if only a halogen were used alone but to a level that sanitizes the water when used in conjunction with minerals from dispensing puck 10. Next, one places the floating dispenser in the pool or spa (not shown) to maintain the pool or spa in a sanitized condition through dispersion of both a halogen and a mineral from the floating halogen dispenser 20.

A benefit of the method of using two dispersants for sanitizing a body of water is that the least two dispersants can provide a longer sanitizing period then if only halogen pucks 29 were used even though at least one of the halogen pucks in the floating dispenser 20 may have been replaced by the nondissolvable cylindrical mineral puck 10 (FIG. 3).

For example, one can decrease the halogen content in a pool or spa having a floating halogen dispenser 20 through the adjustable water ports 31. When the halogen pucks are used alone one normally maintains the pool or spa in a sanitized condition for human immersion solely through halogen dispersion from a set of halogen pucks in the halogen dispenser by maintaining a level of halogen in excess of 2 ppm in the pool or spa if the halogen is chlorine. To convert from a single dispersant dispensing mode to a dual dispensing move one may determine a first water port setting of the floating dispenser that maintains a pool or spa in a safe condition for human contact over a first sanitation period when only the set of halogen pucks are located in the floating dispenser in FIG. 3B. Next, one places at least one mineral puck 10 in a halogen chamber 25 of the floating dispenser 20 wherein the weight of the mineral puck 10 is preferably equal or less than the weight of a halogen puck 29. FIG. 3 shows one having placed a plurality of halogen pucks 29 in a halogen chamber 25 in the floating dispenser. Next one reduces the water port setting from the first water port setting (as shown in FIG. 3B) to the second water port setting (as shown in FIG. 3A) to reduce the halogen level to a normally unsafe level if only a halogen were used alone but to a lower halogen level that sanitizes the water when the halogen is used in conjunction with a dispensing device such as the mineral puck 10. For example, less than 2 ppm of halogen if the halogen is chlorine although other levels of halogen may be selected based on water conditions as well as the type of halogen selected. By placing the floating dispenser 20 in the pool or spa one can maintain the pool or spa in a sanitized condition through dispersion of both a halogen and a mineral from the floating halogen dispenser 20. The method of replacing at least one of the halogen pucks, which for example may be a chorine or a bromine puck, with a non-dissolvable immersible dispensing puck 10 in the shape of a dissolvable halogen puck 29 to form a dispenser within a dispenser where only one of the dispenser has adjustable water ports can be used with other types of dispensers including non-floating dispensers without departing from the spirit and scope of the invention.

The non-dissolvable dispenser puck has been described herein as having a housing with a cylindrical shape and a single compartment therein, however, it is envisioned that the housing may have other shapes including those shapes, which may or may not mimic a halogen dispersant. For example, housing shapes other than cylindrical may be used as long as the housing has a shape and size such that the housing can be placed in a space normally occupied by a halogen puck or pucks in a dispenser. The term puck has been used herein to describe both the halogen dispersant and a container for holding a further dispersant that can be placed into a chamber of a dispenser that normally holds only a halogen. The halogen puck may take a variety of shapes or sizes but as used herein the halogen puck is a solid that dissipates into a body of water when placed in contact with a body of water, which may include bodies of water besides pools and spas. While the use of a mineral has been described as a preferred dispersant for placement in the dispensing puck other non-halogen dispersants may be used in conjunction with the halogen without departing from the spirit and scope of the invention. Similarly, the shape and size of the halogen puck may not be the same as the shape or size of the non-dissolvable puck that holds the second biocide and the pucks may or may not be stacked in the dispersant chamber of the halogen dispenser.

A further feature of the invention is that the non-dissolvable immersible dispensing puck can take advantage of different dispersant rates to maintain the proper level of different dispersants within a body of water. Thus, dispenser puck 10, which is a standalone dispenser, includes a set of water ports 12 for water access to a dispersant, such as minerals, located within the non-dissolvable immersible dispensing puck and the control of the adjustable water port of the dispenser 20 for halogen dispersal is independent of a control of a dispersant from the non-dissolvable immersible dispensing puck 10 as long as the adjustable water ports 31 are maintained in an open condition to permit water access to the dispersants within the dispenser puck 10.

We claim:

1. A halogen dispenser for normally delivering a single dispersant comprising: a housing having a single halogen chamber for normally holding a plurality of halogen pucks in either a stacked or non-stacked condition; a plurality of halogen pucks located in the halogen chamber; and a rigid non-dissolvable immersible dispensing puck located in the halogen chamber, with said rigid non-dissolvable immersible dispensing puck and said plurality of halogen pucks simultaneously dispensing a different dispersant therefrom; a first dispersant from the non-dissolvable immersible dispensing puck comprising a source of metal ions and a second dispersant from the halogen pucks comprising a halogen whereby the halogen pucks change shape as the halogen pucks dissolve while the rigid non-dissolvable immersible dispensing puck retains its shape while continuing to dispense the first dispersant therefrom.

2. The halogen dispenser of claim 1 comprising a floating dispenser wherein the halogen pucks and the rigid non-dissolvable immersible dispensing puck are located in a stacked relationship within the halogen chamber in the floating dispenser and the floating dispenser includes an adjustable water port for limiting water access to the halogen chamber therein to control a level of halogen in a body of water.

3. The halogen dispenser of claim 2 wherein each of the halogen pucks of the plurality of halogen pucks have a top surface and a bottom surface; and the rigid non-dissolvable immersible dispensing puck having a top surface and a bottom surface for stacking in a face-to-face condition with either the top surface or the bottom surface of at least one of the plurality of halogen pucks.

4. The halogen dispenser of claim 3 including at least one rigid non-dissolvable immersible dispensing puck and at least a plurality of dissolvable water activeable pucks wherein the plurality of dissolvable water activeable pucks is in excess of the at least one non-dissolvable immersible dispensing puck.

5. The halogen dispenser of claim 2 wherein the rigid non-dissolvable immersible dispensing puck is a standalone dispenser that includes a set of adjustable water ports for water access to the source of metal ions located within the non-dissolvable immersible dispensing puck and a control of the set of adjustable water ports of the dispenser is independent of a control of the first dispersant from the non-dissolvable immersible dispensing puck as long as the set of adjustable water ports are maintained in an open condition.

6. A method of decreasing a halogen content in a pool or spa having a floating halogen dispenser with adjustable water ports where a halogen alone normally maintains the pool or spa in a sanitized condition for human immersion solely through halogen dispersion from a set of halogen pucks in the halogen dispenser which maintain a level of halogen in excess of 1 ppm in the pool or 2 ppm in the spa when the halogen is chlorine comprising: determining a first water port setting of the floating dispenser that maintains the pool or spa in a condition for human contact over a first sanitation period when only the set of halogen pucks are located in the floating dispenser; placing at least one mineral puck in a halogen chamber of the floating dispenser wherein the weight of the mineral puck is equal or less than the weight of a halogen puck; placing a plurality of halogen pucks in a the halogen chamber in the floating dispenser to form a dual dispersant dispenser; reducing the water port setting from the first water port setting to reduce the halogen level to a level insufficient to sanitize if only the halogen were used but to a level that sanitizes the water when used in conjunction with a mineral in the mineral puck; and placing the floating dispenser in the pool or spa to maintain the pool or spa in the sanitized condition through dispersion of both the halogen and the mineral from the floating halogen dispenser.

* * * * *